W. E. CAMPBELL.
AUTOMATIC TEMPERATURE INDICATOR.
APPLICATION FILED APR. 14, 1909.
934,281.
Patented Sept. 14, 1909.
3 SHEETS—SHEET 2.
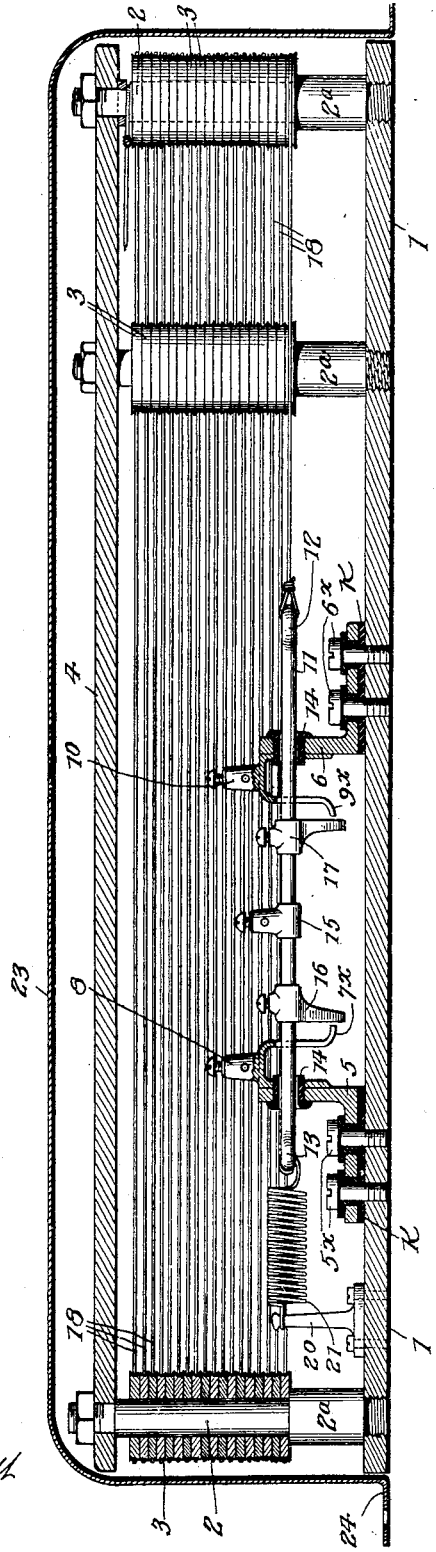
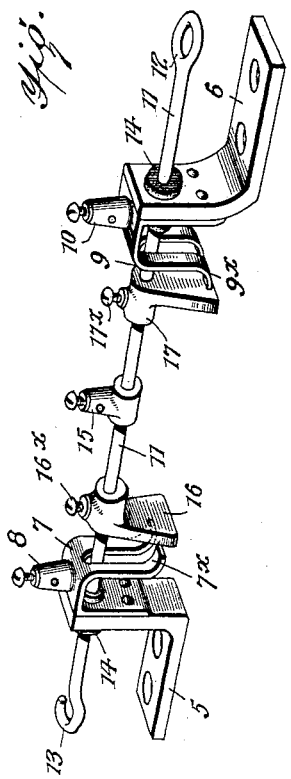
Witnesses
Inventor
WILLIAM E. CAMPBELL,
By
Attorneys

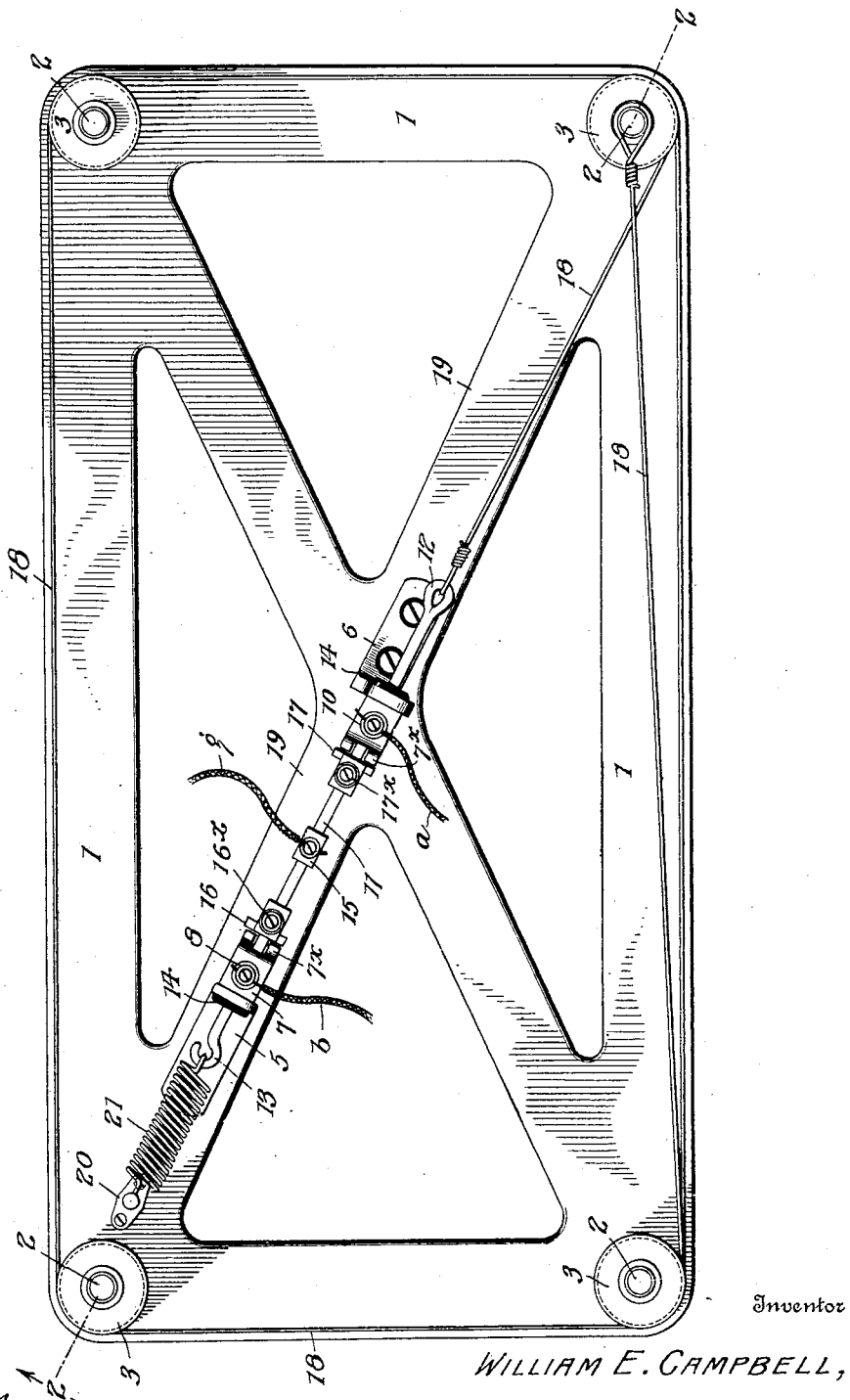

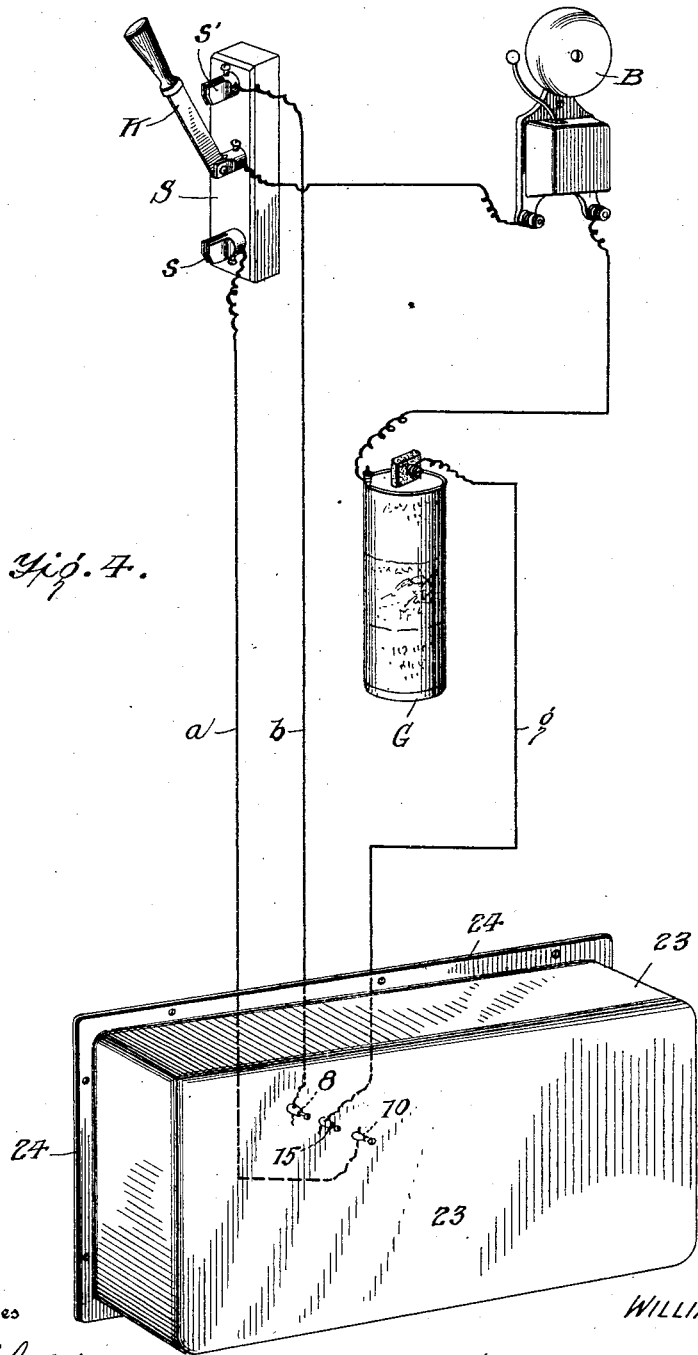

UNITED STATES PATENT OFFICE.

WILLIAM EVANS CAMPBELL, OF CHESTER, SOUTH CAROLINA.

AUTOMATIC TEMPERATURE-INDICATOR.

934,281. Specification of Letters Patent. Patented Sept. 14, 1909.

Application filed April 14, 1909. Serial No. 489,800.

*To all whom it may concern:*

Be it known that I, WILLIAM E. CAMPBELL, a citizen of the United States, and a resident of Chester, in the county of Chester and State of South Carolina, have made certain new and useful Improvements in Automatic Temperature-Indicators, of which the following is a specification.

My invention relates to devices for automatically indicating a predetermined temperature, and it consists in the constructions, combinations and arrangements herein described and claimed.

An object of my invention is to provide means for automatically indicating the temperature and sounding an alarm, and the device is primarily intended for use in connection with exposed water pipes in rural districts when sudden changes of temperature are likely to occur. It is not confined, however, to water pipes alone, but may be used for the purpose of maintaining a temperature either above or below some predetermined temperature as the freezing or the frost point.

A further object of my invention is to provide a temperature indicating device whose operating parts consist of metal and which is not subject to the danger of breakage like the thermostats which have the common glass tube filled with mercury.

A further object of my invention is to provide a device which is of comparatively simple construction and yet which is accurate and positive in action.

Other objects and advantages will appear in the following specification and the novel features of the device will be particularly pointed out in the appended claims.

My invention is illustrated in the accompanying drawings in which—

Figure 1 is a plan view of the device; Fig. 2 is a vertical section along the line 2—2 of Fig. 1; Fig. 3 is a detail view of the contact points and Fig. 4 is a view showing the circuit connections.

In carrying out my invention I provide a metal base 1 of the shape shown in Fig. 1. At each corner of the base are the posts 2 which are screwed to the base as shown in Fig. 2, and are provided with enlarged portions $2^a$ arranged to support a series of grooved wheels or pulleys 3 which are designed to rotate on the post 2 as an axis. Secured to the posts at their upper ends is a top 4 of a form similar to that of the base 1 and which is designed as a strengthening member.

The contact mechanism is clearly shown in Fig. 3. It consists of the L-shaped uprights 5 and 6 which are secured to the base 1 by means of the screws $5^x$ and $6^x$ respectively, the uprights being insulated from both the screws and the base by means of suitable insulation $k$. The L-shaped supporting member 6 is provided with a spring contact member 7 having a binding post 8 secured thereto while the member 6 is provided with a similar contact member 9 which has a binding post 10. Arranged to pass through the alined supporting members 5 and 6, is a rod 11 having an eye 12 at one end and a hook 13 at the other. The rod is insulated from the uprights 5 and 6 by means of the insulating sleeves 14. The rod 11 has a central binding post 15, while adjustably secured to the rod 11 and slidable therealong are the contact members 16 and 17.

The thermal member consists of a continuous wire 18 one end of which is fastened to one of the posts 2 as shown in Figs. 1 and 2. The wire is then wound around the rectangular frame provided by the four posts, the first convolution engaging the upper pulley 3 on each of the posts, the second convolution engaging the next lower pulley on each of the posts and the lower end of the wire being brought out and attached to the eye 12 of the rod 11. The wire may be made of any kind of metal but is preferably of a metal such as copper which will expand and contract considerably with a comparatively small change in temperature.

On the cross member 19 to which the contact device is secured is an upright 20 to which one end of a stiff spiral spring 21 is attached, the other end of the spiral spring being attached to the hook 13.

In Fig. 4 I have shown the circuit connections whereby an alarm will be sounded when the temperature is below or above certain limits. The circuit includes a bell B or other sounding device, a generator G which may be a dry cell as shown in the drawing or any other source of current, and the switch S. One terminal of the generator G is connected by means of the wire $g$ to the binding post 15. The terminal $s$ of the switch S is connected by means of the wire $a$ to the binding post 10 while the other terminal $s'$ of the switch S is connected by the wire $b$ to the binding post 8.

From the foregoing description of the various parts of the device, the operation thereof may be readily understood.

The instrument is preferably located on the outside of a building and it may be secured underneath the cornice or in some other convenient place. In order to protect the device from the weather, I have arranged the casing 23 having the flanges 24 adapted to be attached directly to the side of the building in the manner shown in Fig. 2. The device works upon the principle of expansion and contraction of the wire due to the change in temperature. As the wire expands, its length becomes greater and this additional length is taken up by means of the spiral spring 21 thereby causing a bodily movement of the rod 11 and a consequent movement of the contact members 16 and 17 located thereon. These contact members 16 and 17 may be set at different positions along the rod by means of the set-screws $16^\times$ and $17^\times$ and are arranged to engage the forked ends $7^\times$ of the spring contact member 7 and the ends $9^\times$ of the spring contact member 9 respectively.

Let us suppose that the apparatus is designed to sound an alarm when the temperature drops to 34° Fahrenheit or just a little above freezing. The position of the contact member 17 is determined by actual experiment before the apparatus is set up for use. As the wire contracts and shortens the contact member 17 is brought nearer the spring contacts $9^\times$ until they finally engage them at 34°. For a low temperature the knife K of the switch S must be engaging the switch terminal $s$. A current will now flow through G, $g$, 15, 11, 17, $9^\times$, 10, $a$, $s$, K through the bell and back to the battery. The alarm will thus be sounded and the plants or shrubs may be covered or removed to a place of greater warmth to protect them.

For a high temperature the knife K of the switch S is turned into engagement with the switch terminals $s'$. Now as the wire expands the member 16 is brought into contact with the spring ends $7^\times$ of the contact member 7 and the current now flows from G through $g$, 15, 11, 16, $7^\times$, 8, $b$, $s'$, K through the bell to battery. The provision of the rollers 3 lessens the friction of the lengthening and shortening wire thereby increasing the accuracy of the device.

I am aware that other forms of the device based upon the same general idea might be made, but I consider as my own all such modifications as fairly fall within the spirit and scope of the invention.

I claim:—

1. In an automatic temperature indicator, a rectangular base, posts secured at each corner of said base, a series of pulleys loosely disposed on each post, an expansible and contractible wire secured to one of said posts and arranged in convolutions around the four posts, the first convolution engaging the uppermost pulleys of the four posts and the other convolutions engaging their respective pulleys, a pair of L-shaped supporting members secured to said base, spring contacts carried by each of said supporting members, a movable rod carried by said supporting members and insulated therefrom, a spring secured to said base and attached at one end of said rod, the other end of said rod being attached to the free end of the wire, a pair of adjustable contacts carried by said rod and arranged to engage said spring contacts and an alarm circuit arranged to be closed by the engagement of said contacts.

2. In an automatic temperature indicator, a rectangular base, posts secured at the corners of said base, a series of pulleys loosely disposed on each of said posts, an expansible and contractible wire secured to one of said posts, said wire being wrapped around the pulleys on said posts, a pair of upright supports secured to said base each upright having spring terminals, a spiral spring secured to said base, a movable rod connected at one end to said spiral spring and at the other to the free end of the wire, and a pair of adjustable contact-members secured to said rod and adapted to engage said stationary spring contacts.

3. In an automatic temperature indicator, a base, posts secured thereto, a series of superposed pulleys disposed on said posts for rotation around the latter, an expansible and contractible wire secured at one end to one of said posts and arranged to engage said pulleys, a spring secured to said base, a movable contact member secured to said spring and to the free end of said wire and a stationary contact member carried by the base and adapted to be engaged by said movable contact member.

4. In an automatic temperature indicator, a base, posts secured at the corners of said base, a plurality of pulleys disposed on each of said posts for rotation upon the post as an axis, an expansible and contractible wire secured at one end to one of said posts, the main portion of the wire being supported by frictional engagement with the pulleys, a movable contact secured to the free end of said wire and a stationary contact member carried by the base and adapted to be engaged by said movable contact member.

WILLIAM EVANS CAMPBELL.

Witnesses:
T. J. CORNWELL,
S. E. WYLIE.